(12) United States Patent
Hrncir et al.

(10) Patent No.: US 10,066,979 B2
(45) Date of Patent: Sep. 4, 2018

(54) SEALED HEAD CONSTRUCTION FOR LIQUID LEVEL TRANSDUCERS

(71) Applicant: Texas LFP, LLC, Dallas, TX (US)

(72) Inventors: Robert E. Hrncir, Irving, TX (US); John Gordon Storace, Plano, TX (US)

(73) Assignee: Rochester Gauges, Inc., Dallas, TX (US)

( * ) Notice: Subject to any disclaimer, the term of this patent is extended or adjusted under 35 U.S.C. 154(b) by 140 days.

(21) Appl. No.: 14/958,925

(22) Filed: Dec. 3, 2015

(65) Prior Publication Data

US 2016/0187179 A1 Jun. 30, 2016

Related U.S. Application Data

(60) Provisional application No. 62/087,163, filed on Dec. 3, 2014.

(51) Int. Cl.
| | |
|---|---|
| *G01F 23/26* | (2006.01) |
| *G01F 23/284* | (2006.01) |
| *F16B 33/00* | (2006.01) |
| *G01S 13/10* | (2006.01) |

(52) U.S. Cl.
CPC ............ *G01F 23/26* (2013.01); *G01F 23/268* (2013.01); *G01F 23/284* (2013.01); *F16B 33/004* (2013.01); *G01S 13/10* (2013.01); *Y10S 285/913* (2013.01)

(58) Field of Classification Search
CPC ....... G01F 23/268; G01F 23/26; G01F 23/284

USPC ............................................ 73/290 R–290 V
See application file for complete search history.

(56) References Cited

U.S. PATENT DOCUMENTS

| | | | | |
|---|---|---|---|---|
| 5,781,019 A | * | 7/1998 | Telder | G01F 23/284 324/632 |
| 5,955,684 A | * | 9/1999 | Gravel | G01F 23/268 73/866.5 |
| 2011/0156352 A1 | * | 6/2011 | Bond | F16J 15/064 277/312 |
| 2015/0114106 A1 | * | 4/2015 | Muzzo | G01F 23/263 73/304 C |

* cited by examiner

*Primary Examiner* — Daniel S Larkin
*Assistant Examiner* — Nathaniel Kolb
(74) *Attorney, Agent, or Firm* — Alvin R. Wirthlin

(57) ABSTRACT

A liquid level transducer (10) for mounting to a cryogenic tank includes a mounting head assembly (14) for connection to the tank (12) and an elongate sensing probe assembly (16) extending from the mounting head assembly (14) and into the tank. The mounting head assembly (14) has a lower mounting member (40) connected to the sensing probe assembly (16). The mounting head assembly also includes a tank mounting member (42) with a central bore (74) and a transverse wall (87) located within the bore. An upper connecting section (60) of the member (40) is threaded into the bore (74). A seal (147) is positioned between the transverse wall (87) and the upper connecting section (60). The upper connecting section (60) has a corrugated feature that receives and deforms the seal to interlock the components together and increase the sealing surface area therebetween.

20 Claims, 10 Drawing Sheets

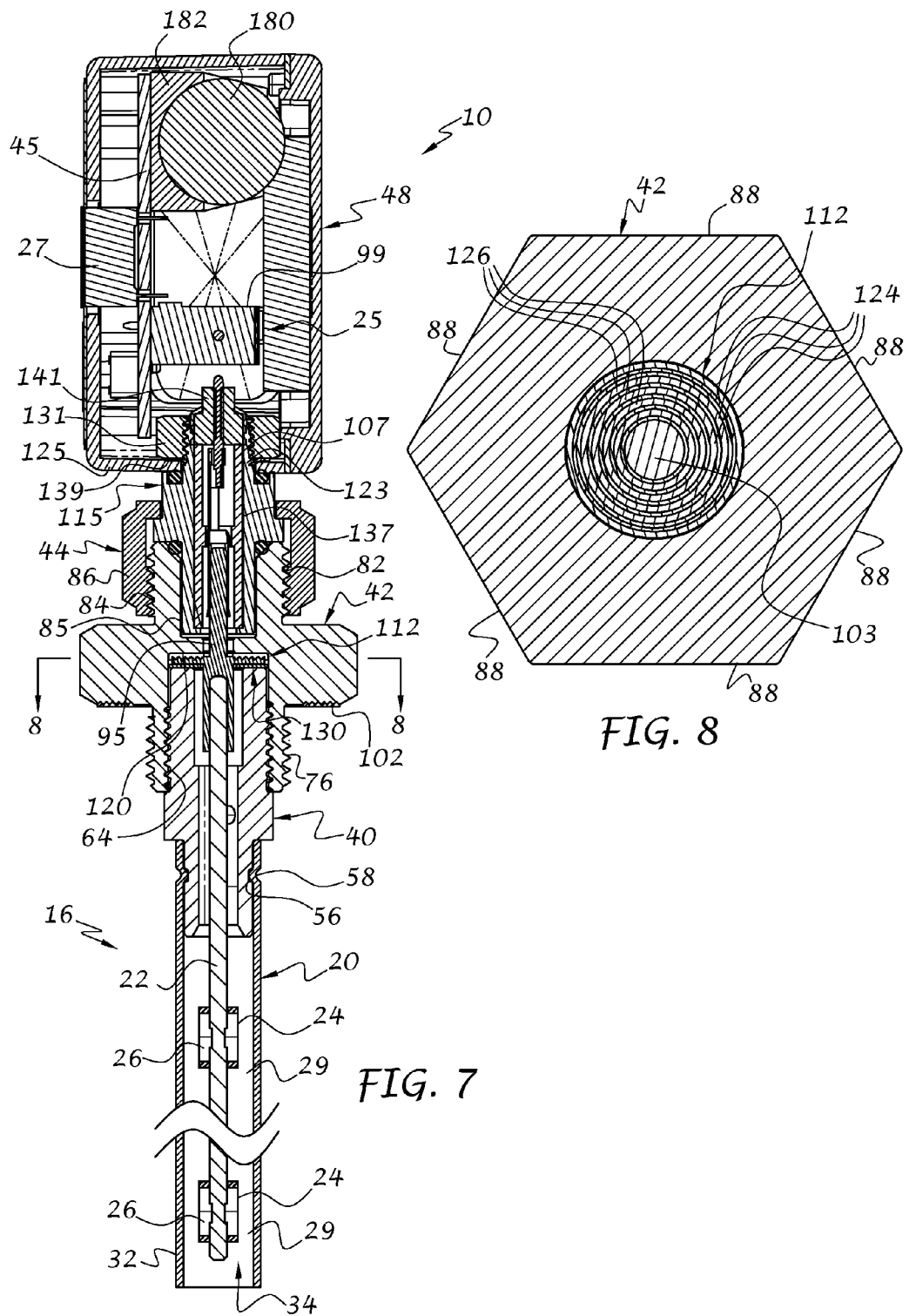

SEALED HEAD CONSTRUCTION FOR LIQUID LEVEL TRANSDUCERS

CROSS-REFERENCE TO RELATED APPLICATIONS

This application claims the benefit of U.S. Provisional Application No. 62/087,163 filed on Dec. 3, 2015, the disclosure of which is hereby incorporated by reference.

BACKGROUND OF THE INVENTION

This invention relates to liquid level transducers and other sensors associated with tanks, and more particularly to a liquid level transducer having a sealed head construction for use with cryogenic tanks, high pressure containers holding liquefied gas, such as liquefied petroleum gas (LPG), propane, or other fuels that exit the tank in a gaseous state such as nitrogen, oxygen, hydrogen and helium, as well as fuel tanks or other containers for holding a liquid that exits the tank in a liquid and/or gaseous state.

Cryogenic tanks hold the liquefied state of fluids that are normally in the gaseous state at room temperature and atmospheric pressure. Liquefaction of these fluids typically occurs at very low temperatures and/or very high pressures. The measurement of various conditions of these fluids within cryogenic tanks, such as liquid level, temperature, and pressure conditions, are often desired. However, due to the extreme conditions associated with the storage and maintenance of these fluids in the liquefied state, it has been a continuous challenge with the prior art to ensure the integrity of the tank at the measurement point. For example, transducers for measuring the level of liquid in such tanks are typically mounted to the tank wall and extend through an opening in the tank. Leakage of the fluid in the gaseous state can occur if the seal between the transducer and the tank loses its integrity. This problem can also occur internally with pass-thru wires, connectors, and the like, within the transducer, resulting in subsequent loss of the fluid and its attendant cost, health concerns due to exposure, as well as undesirable consequences of the unintended release of volatile or combustible fluids.

It would therefore be advantageous to provide a transducer, mounting head, or the like, that overcomes one or more disadvantages of the prior art.

BRIEF SUMMARY OF THE INVENTION

In accordance with one aspect of the invention, a transducer (10) for determining the level of liquid within a pressurized tank (12) is sealed internally while allowing the passage of an insulated electrical conductor. The transducer includes an elongate sensing probe (16) adapted to extend into the tank for determining liquid level within the tank. The elongate sensing probe has a first elongate electrode (22) for performing at least one of generating, modifying, and relaying an electrical signal indicative of the liquid level. A mounting head assembly (14) is connected to the elongate sensing probe (16), and is adapted for connection to the tank for sealing the tank opening (17) to thereby maintain pressure within the tank (12). The mounting head assembly includes a lower mounting member (40) having a first lower connecting portion (52) connectable to the elongate sensing probe (16), a first upper connecting portion (60), and a first central bore (68) extending through the first lower and upper connecting portions and defining a first central axis. The first elongate electrode extends through the first central bore. A tank mounting member (42) has a second lower connecting portion (72) with a second central bore (74) formed therein and a wall section (87) located within the second central bore and extending transverse to a second central bore axis. The second central bore being sized to receive the first elongate electrode. The first upper connecting portion (60) is received and retained within the second central bore (74) with an upper end of the first upper connecting portion (60) being located adjacent to the wall section (87). A corrugated feature (152, 154, 167, 169) is associated with at least one of the wall section (87) and the upper end. A first inner seal (112, 147) is constructed of resilient material and configured for location in the second central bore (74) between the wall section (87) and the upper end. The first seal is pressed into the corrugated feature to thereby interlock the first inner seal and the corrugated feature while increasing a surface area therebetween and seal the mounting head assembly against leakage.

According to a further aspect of the invention, a mounting head assembly (42) for connection to a cryogenic tank (12) having a tank wall (15) and an opening (17) formed therein, and being adapted for sealing the tank opening (17) to thereby maintain pressure within the tank (12), comprises a lower mounting member (40) having a first upper connecting portion (60) and a first central bore (68) extending therethrough, with the lower mounting member being adapted for connection to a sensor probe. A tank mounting member (42) has a lower connecting portion (72) with a second central bore (74) formed therein and a wall section (87) located within the second central bore and extending transverse to a central axis of the second central bore. The first upper connecting portion (60) is received and retained within the second central bore (74) with an upper end of the first upper connecting portion (60) being located adjacent to the wall section (87). A corrugated feature (152, 154, 167, 169) is associated with at least one of the wall section (87) and the upper end. An inner seal (112, 147) is constructed of resilient material and configured for location in the second central bore (74) between the wall section (87) and the upper surface (144). The inner seal is pressed into the corrugated feature to thereby interlock the inner seal and the corrugated feature while increasing a surface area therebetween and sealing the mounting head assembly against leakage.

According to yet another aspect of the invention, a transducer (10) for determining the level of liquid within a pressurized tank (12) includes a mounting head assembly (14) adapted for connection to the tank (12); and an elongate sensing probe assembly (16) adapted to extend into the tank from the mounting head assembly (14). The mounting head assembly comprises a lower mounting member (40) with a first central bore (68) for receiving at least a portion of the sensing probe assembly (16). The mounting head assembly also includes a tank mounting member (42) with a lower connection section (72) having a second central bore (74) and a transverse wall (87) located within the second central bore. The second central bore is sized to receive at least a portion of the sensing probe assembly. The lower mounting member (40) has an upper connecting section (60) located within the second central bore (74) with an upper end of the upper connecting section being located adjacent to the transverse wall. A seal (147) is positioned between the transverse wall (87) and the upper connecting section (60). At least one of the transverse wall and the upper end of the upper connecting section has a corrugated shape that receives the seal to thereby form a labyrinth-type seal to thereby seal the mounting head assembly against leakage.

BRIEF DESCRIPTION OF THE DRAWINGS

The following detailed description of the preferred embodiments of the present invention will be best understood when considered in conjunction with the accompanying drawings wherein:

FIG. 7 is a longitudinal sectional view of the liquid level transducer taken along line 7-7 of FIG. 1;

FIG. 8 is a sectional view of the liquid level transducer taken along line 8-8 of FIG. 7.

Figure 1:
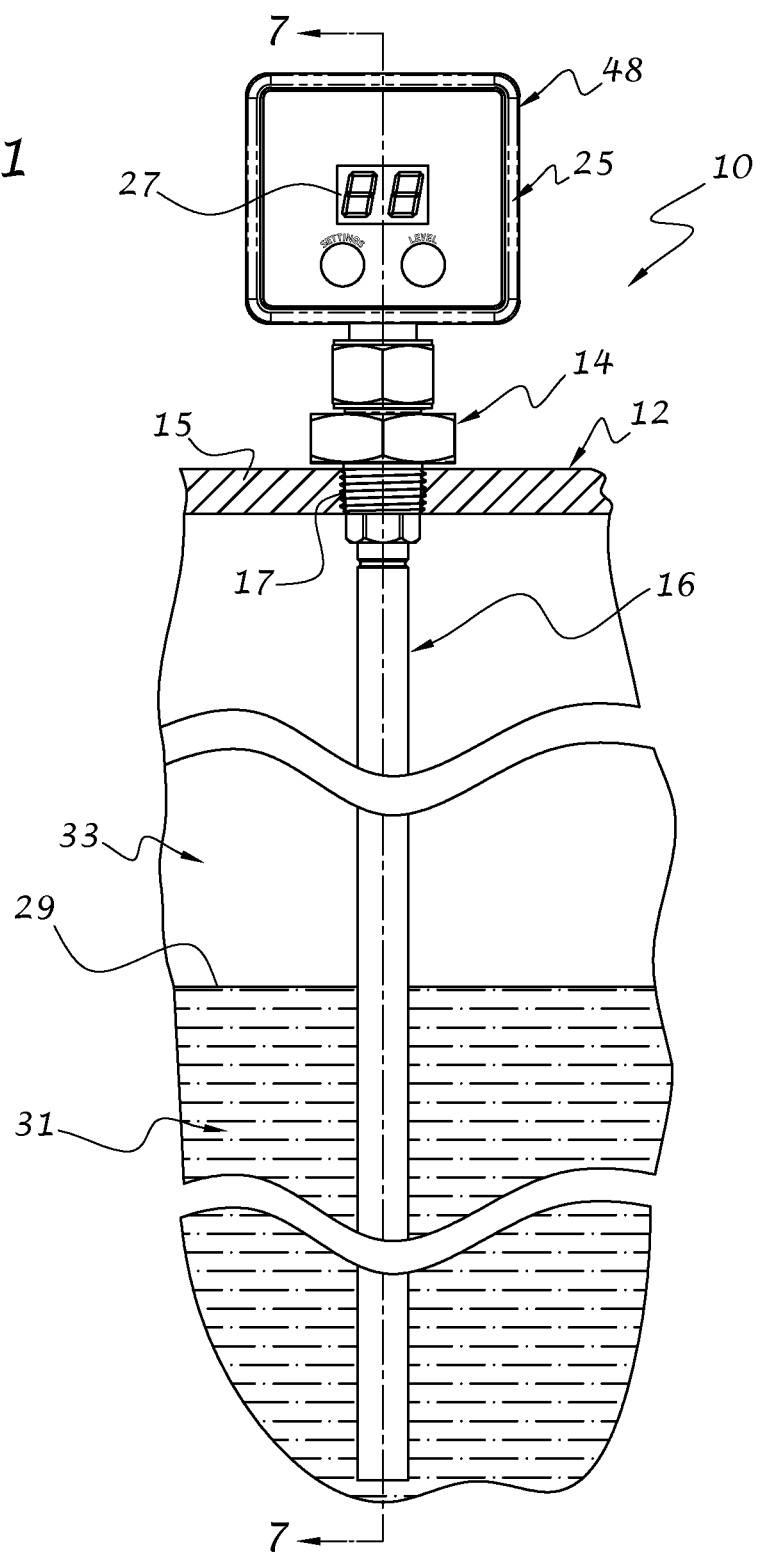
FIG. 1 is a front elevational view of a liquid level transducer in accordance with the invention.

It is noted that the drawings are intended to depict only exemplary embodiments of the invention and may not necessarily be to scale. The drawings therefore should not be considered as limiting the scope thereof. The invention will now be described in greater detail with reference to the accompanying drawings, wherein like designations denote like elements throughout the drawing figures.

DETAILED DESCRIPTION OF THE INVENTION

Figure 2:
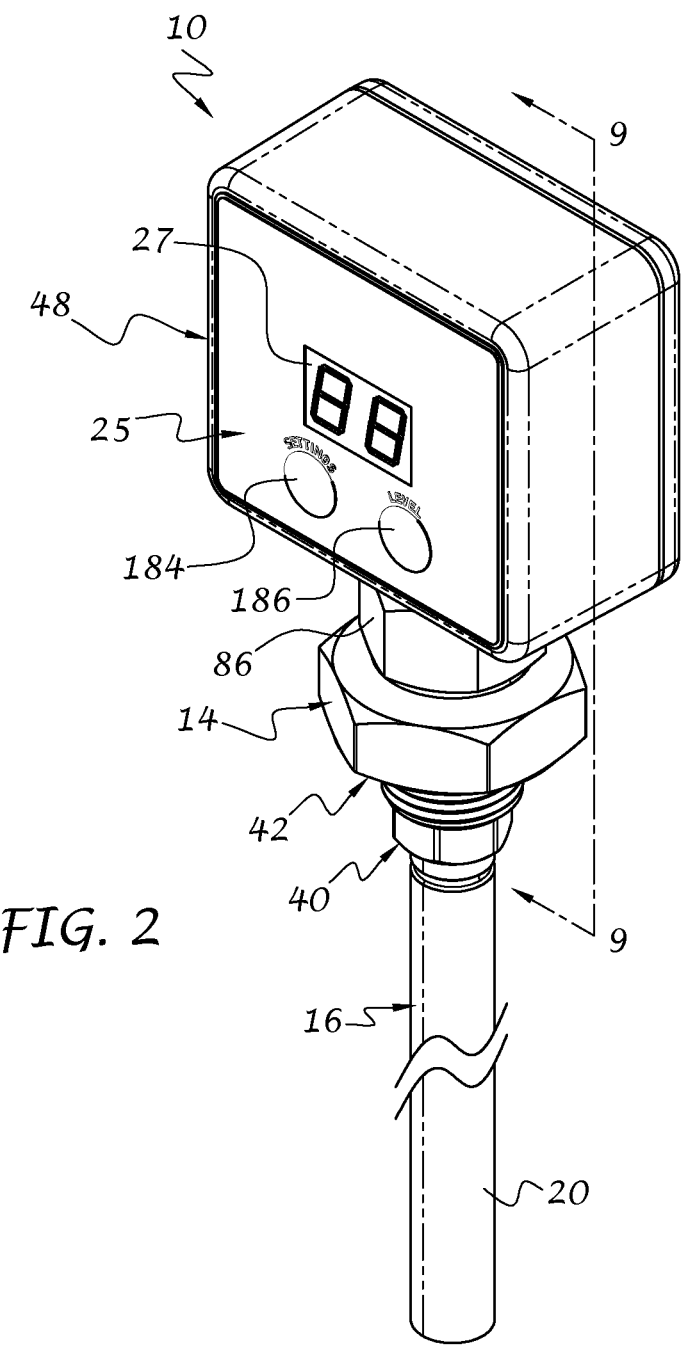
FIG. 2 is top left isometric view thereof.
Figure 3:
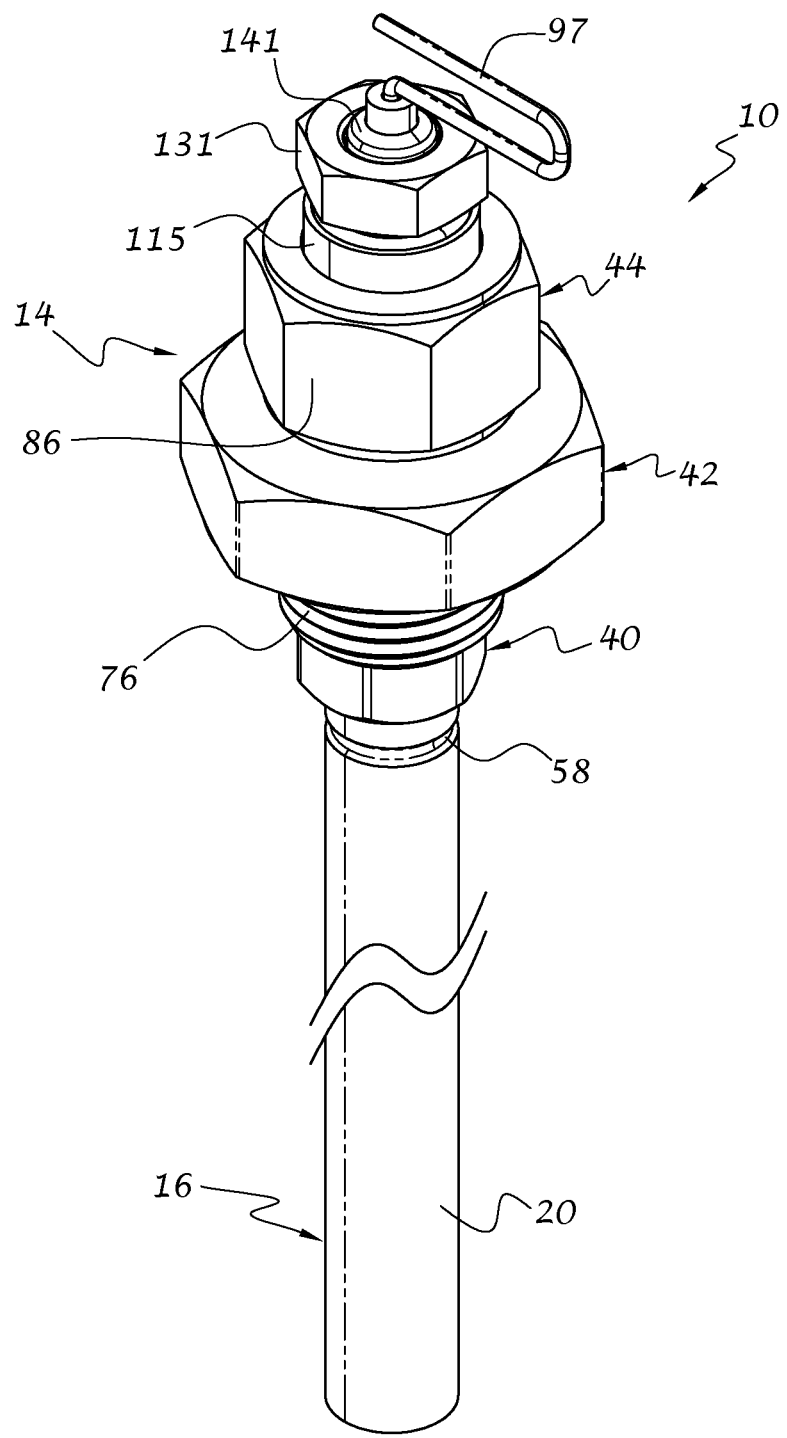
FIG. 3 is a top left isometric view thereof with the display housing and processing electronics removed.

Referring now to the drawings, and to FIGS. 1-3 in particular, a liquid level transducer 10 in accordance with an exemplary embodiment of the invention is illustrated. The liquid level transducer 10 preferably has a mounting head assembly 14 that connects to the wall 15 (FIG. 1) of a tank 12, and a sensing probe assembly 16 that extends from the mounting head assembly 14 and into the tank 12 through an opening 17 in the tank wall 15. An electronics assembly 25, which may include a display 27, is mechanically and electrically connected to the head assembly 14 for processing liquid level signals from the sensing probe assembly 16 and displaying the level or height 29 (FIG. 1) of liquid and/or the location of an interface between the liquid phase 31 and gaseous phase 33 of the fluid in the tank 12.

The liquid level transducer 10 is especially suitable for cryogenic tanks or other high pressure containers holding liquefied gas, such as liquefied petroleum gas (LPG), propane, or other fuels that are stored in the tank in a liquid/gaseous state under high pressure, as well as fuel tanks or other containers for holding a liquid that exits the tank in a gaseous and/or liquid state, or any other tank or container associated with a vehicle, machine, or system for holding, transporting, and/or delivering a product in a liquid state 31 (FIG. 1) and/or a high pressure gaseous state 33 (FIG. 1), and further where it is desirous to determine the level and/or volume of the liquid state of the product within the tank. The present invention is especially suitable for fuel tanks associated with heavy-duty propane or liquefied petroleum LPG delivery trucks and stationary tanks, light-duty passenger vehicles, farm and construction equipment, generators, as well as other machines or systems powered by propane, natural gas, LPG or the like. Moreover, the present invention can be connected to tanks associated with vehicles, equipment, and systems powered by gasoline, kerosene, diesel, etc. It will be understood that the afore-mentioned vehicles, machines, and systems are given by way of example only as the invention can be used in a wide variety of vehicles, machines, and systems without departing from the spirit and scope of the invention.

Although the transducer 10 is shown in the drawings as being oriented vertically, it will be understood that the transducer 10 can be configured for mounting in a horizontal orientation or any other suitable angle or orientation, without departing from the spirit and scope of the invention, such angle or orientation being dependent at least partially upon space constraints as dictated by the structure of the vehicle, machine, system, etc., with respect to the tank 12 and/or the particular shape and mounting requirements of the tank or vehicle.

The mounting head assembly 14 and sensing probe assembly 16 include, in accordance with the invention, unique structure to accommodate both the measurement of liquid level within the tank and the ability to seal the tank opening 17 (FIG. 1) under high pressure conditions that may exist in the tank 12 using a variety of different liquid level measurement configurations. In order to facilitate discussion of the present invention, the probe assembly 16 will be described in the context of a solid-state capacitive-type liquid level measurement configuration, it being understood that other known measurement devices, methods, and/or techniques can be used, including but not limited to, resistance, conductance, impedance, magnetostrictive sensors, reed switches, heated wire, ultrasonic transmitters/receivers, tuning fork technology, and so on. Besides the suitability of capacitance measurement for the extreme conditions within the tank, time domain reflectometry (TDR) is especially adaptable to such environments, where impulses are propagated down a waveguide, such as one or more elongate components of the probe assembly, and reflected back up the waveguide when the impulse hits the surface 29 (FIG. 1) of the liquid. The time difference between generation of the impulse and return of the impulse is indicative of liquid level. Accordingly, it will be understood that the present invention can incorporate a wide variety of different level measurement means without departing from the spirit and scope of the invention.

Moreover, although the invention will be described in conjunction with an electronics assembly 25 (FIG. 2) having a particular configuration, it will be understood that the electronics assembly is given by way of example only, and can include a wide variety of different features and functions for automatic and/or manual reading, calibrating, and/or transmitting liquid level, temperature, pressure and other information associated with the tank without departing from the spirit and scope of the invention. Accordingly, the liquid level transducer 10 is shown in FIG. 3 without a particular electronics assembly, and is thus capable of interfacing with any suitable device for directly viewing and/or wirelessly transmitting to a remote location information relating to the tank and its contents.

With additional reference to FIGS. 4-7, the sensing probe assembly 16 will first be described and, in accordance with an exemplary embodiment of the invention, senses liquid level in a linear direction via a change in capacitance based on a corresponding change in liquid level within the tank 12 (FIG. 1). To that end, the sensing probe assembly 16 preferably includes a first outer electrode or electrical conductor 20 comprising an elongate hollow tube, and a second inner electrode or electrical conductor 22 comprising an elongate solid rod located coaxially within the hollow tube. The inner electrode 22 is preferably fixed coaxially with the outer electrode 20 via non-conductive spacers 24 that slip over the inner electrode 22 and engage an inner surface 29 of the outer electrode 20. The spacer 24 has an annular wall 26 with radially extending apertures 28 formed therein for receiving the inner electrode 22. Nubs or bumps 30 (see the enlarged section in FIG. 4) are formed on the inner electrode 22 at discrete positions and function as stops for the spacers 24. The nubs 30 can be formed on the inner electrode prior to installing each of the spacers 24, such as by welding the spacers at the discrete positions or by bonding or welding a separate stop element to the inner electrode prior to the installation of each subsequent electrode. Annular collars or other stop elements can be used with, or in place of, the spacers 24 to ensure that the inner and outer electrodes are coaxial. As best shown in FIG. 7, a lower end 32 of the outer electrode 20 is open so that the liquid 31 and gas 33 within the tank 12 (FIG. 1) are located within the inner bore 34 of the outer electrode 20 and surround the inner electrode 22. Since the dielectric constant of the liquid will be different than the dielectric constant of the gas, a change in liquid level within the outer electrode 20 also changes a capacitance value between the inner and outer electrodes, as is well-known, to thereby determine liquid level within the tank 12. Although the inner and outer electrodes have been described with a particular exemplary configuration, it will be understood that the electrodes can comprise a coaxial cable for capacitive or TDR measurement of liquid level as well as other sensing means, as previously described, for generating, modifying, and/or relaying one or more electrical signals indicative of liquid level within the tank.

Referring now to FIGS. 4-9, the mounting head assembly 14 preferably includes a lower mounting member 40 connected to the outer electrode 20, an intermediate or tank mounting member 42 connected to the lower mounting member 40 and for connection to the wall 15 of the tank 12 (FIG. 1), and an upper mounting assembly 44 connected to the intermediate mounting member 42 and the inner electrode 22. The inner electrode 22 and outer electrode 20 are electrically connected to a printed circuit board 45 of the electronics assembly 25 located in a housing assembly 48, which is in turn connected to the upper mounting assembly 44, as will be described in greater detail below. A sealing component 46 cooperates with the lower and intermediate mounting members to ensure that gas and/or liquid under high pressure does not pass through or between the mounting members to thereby prevent leakage of the gas and/or liquid outside of the container 12 through the liquid level transducer 10.

The lower mounting member 40 preferably includes a first body 50 formed of electrically conductive material for mechanical and electrical connection to the outer electrode 20 and the wall 15 of the tank 12, when the tank is also constructed of electrically conductive material. In this manner, the outer electrode 20 functions as an electrical ground of the circuitry and the inner electrode 22 functions as an electrically conductive probe isolated from the electrical ground for providing a liquid level signal dependent on the height of the liquid within the container 12. Depending on the capacitive measurement technique used, the signal may also be dependent on the dielectric constant of the liquid being measured. However, since the dielectric constant for a particular fluid may vary over temperature and other parameters, a suitable measurement and processing technique that eliminates inaccuracies due to changes in the dielectric constant can be used. Such techniques are disclosed in U.S. Pat. No. 8,590,375 issued on Nov. 26, 2013 and entitled "Self-Calibrating Capacitive Liquid Level Sensor Assembly and Method", the disclosure of which is hereby incorporated by reference. It will be understood that the function of the electrodes 20 and 22 can be reversed without departing from the spirit and scope of the invention.

The body 50 of the lower mounting member 40 is preferably formed with a first connecting portion 52, generally cylindrical in shape and sized to receive the upper end 54 of the first electrode 20. An annular groove 56 is formed in the outer surface of the first connecting portion 52. An upper end 54 of the first electrode 20 is crimped or pressed into the groove, as represented by numeral 58 in FIG. 9, for connecting the first electrode 20 to the lower mounting member 40. It will be understood that other connecting means can be used, such as press-fitting, adhesive bonding, surface welding, soldering, and so on, without departing from the spirit and scope of the invention. A second connecting portion 60 is formed on the body 50 with outer threads 62 for engaging inner threads 64 formed in the intermediate mounting member 42 to connect the two members together. Flat tool engaging surfaces 66 (best shown in FIGS. 5 and 6) are formed on the body 50 between the first and second connecting portions so that a tool, such as a wrench or the like, can be used for securing the lower mounting member 40 to the intermediate mounting member 42. A central bore 68 (FIGS. 6 and 9) extends through the body 50. The central bore 68 is preferably larger than the outer diameter of the inner electrode 22 so that the inner electrode and lower mounting body are not in electrical contact with each other. The annular volume between the lower mounting body and the inner electrode within the bore 68 can be filled with insulative material or the like (not shown) to further ensure that the inner electrode 22 is electrically isolated from the lower mounting body.

The intermediate or tank mounting member 42 preferably includes a second body 70 formed of electrically conductive material for mechanical and electrical connection to the lower mounting member 40, and thus the outer electrode 20, as well as the wall 15 of the tank 12, when the tank is also constructed of electrically conductive material for the purpose as previously described. The second body 70 of the tank mounting member 42 is preferably formed with a first connecting portion 72 with a lower central bore 74 extending therethrough and having the internal threads 64 formed on an inner surface of the lower central bore 74 for engagement with the external threads 40 of the lower mounting member 42. The first connecting portion 72 also has external threads 76 formed on an outer surface thereof for engagement with internal threads 78 of the tank opening 17 to thereby connect the tank mounting member 42, and thus the liquid level transducer 10, to the tank 12.

Figure 9:
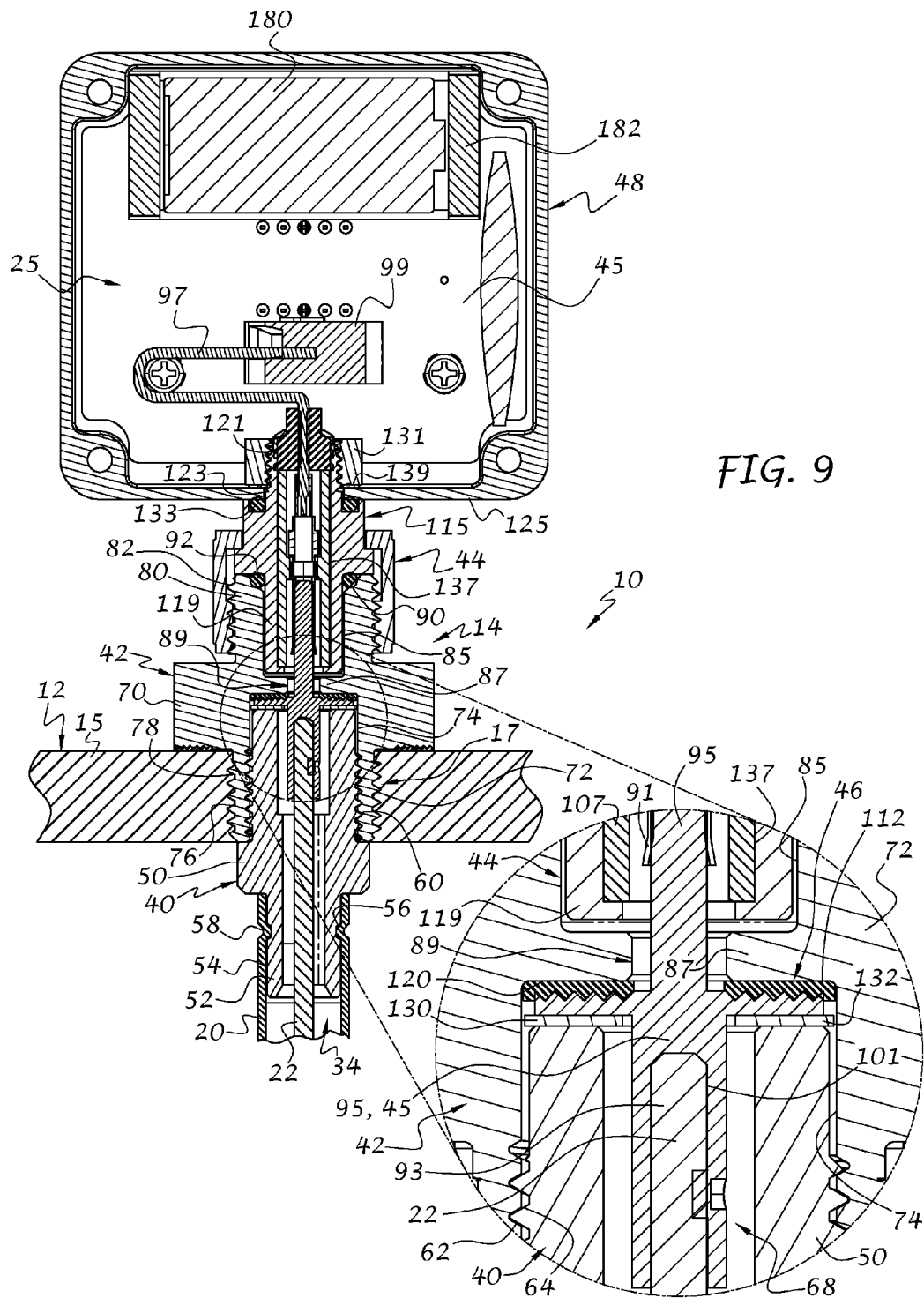
FIG. 9 is a sectional view of the liquid level transducer taken along line 9-9 of FIG. 2 and showing an enlarged portion of the mounting head taken within a circular area as denoted in FIG. 9.

The tank mounting member 42 also includes a second connecting portion 80 that is formed with outer threads 82 for engaging inner threads 84 formed in a coupling 86 of the upper mounting assembly 44 for connecting the housing assembly 48, including the enclosed electronics assembly 25, thereto. An upper central bore 85 extends through the second connection portion 80. An intermediate wall section 87 (see also the tank mounting member 42 in FIG. 5B) is formed in the body 70 between the lower bore 74 and the upper bore 85. An intermediate central bore 89 extends through the wall section and is coaxial with and extends between the lower bore 74 and upper bore 85. The intermediate bore 89 is of sufficient diameter to receive an electrical extension 95, without electrical contact therewith. The extension 95 is in turn mechanically and electrically connected to an upper end 93 of the second electrode 22 via crimping, staking, soldering, or other means for mechanically and electrically connecting the components together, including, but not limited to, forming an internal bore 101 in a cylindrical side wall 105 of the extension 95 and providing a set screw (not shown) or the like that threads into an opening 111 (FIG. 5) of the side wall 105 and engages the upper end 93 of the electrode 22. The electrical extension 95 also includes a connecting pin 103 extending upwardly from the cylindrical wall 105 above the bore 101. The pin 103 is in turn mechanically and electrically connected to an electrical terminal 91 through crimping, press-fitting, soldering, and/or other well-known connection means. The electrical terminal 91 is connected to an insulated electrical wire or cable 97 through crimping, soldering, and so on, which is in turn is mechanically and electrically connected to the PCB 45 via a terminal block 99 (FIG. 9).

A housing connecting member 115 includes a body 117 with a lower connecting portion 119 that is received within the upper bore 85 of the tank mounting member 42 and an upper connecting portion 121 that extends through an opening 123 (FIG. 7) of a lower wall 125 of the housing assembly 48. External threads 129 are formed on the upper connecting portion 121 for engaging the internal threads 149 of a nut 131. The nut is located inside the housing assembly 48. An O-ring 133 is positioned in an annular depression 135 (FIG. 5) such that when the nut 131 is tightened on the upper connecting portion 121 of the housing connecting member 115, the bottom wall 125 and O-ring 133 are sandwiched therebetween to thereby seal the interior of the housing assembly 48. If desired, a lock washer 139 can be provided on the upper connecting portion 121 between the bottom wall 125 and the nut 131 to further secure the assemblies together.

As best shown in FIGS. 5, 6, 7 and 9, a central bore 137 is formed in the body 117 of the housing connecting member 115. The central bore 137 has a diameter that is sufficiently sized to receive the electrical extension 95 and the electrical terminal 91, as well as an insulative sleeve 107 that is located in the bore 137 and surrounds the extension 95 and terminal 91. The insulative sleeve 107 is constructed of an electrically insulating material, such as an elastomer, ceramic, plastic, composite, nonconductive metal, and so on, for further isolating the second electrode from the tank mounting member 42.

An upper isolator seal, such as wire seal 141, has a body 143 with a central bore 145 formed therein for receiving the electrical wire 97 and outer lip seals 147 for engaging and sealing against the bore 137 in the housing connecting member 115. The upper isolator 141 is also preferably constructed of electrically insulating material, such as an elastomer, ceramic, plastic, composite, nonconductive metal, and so on, for further isolating the second electrode from the housing assembly tank mounting member 42

Figure 5:
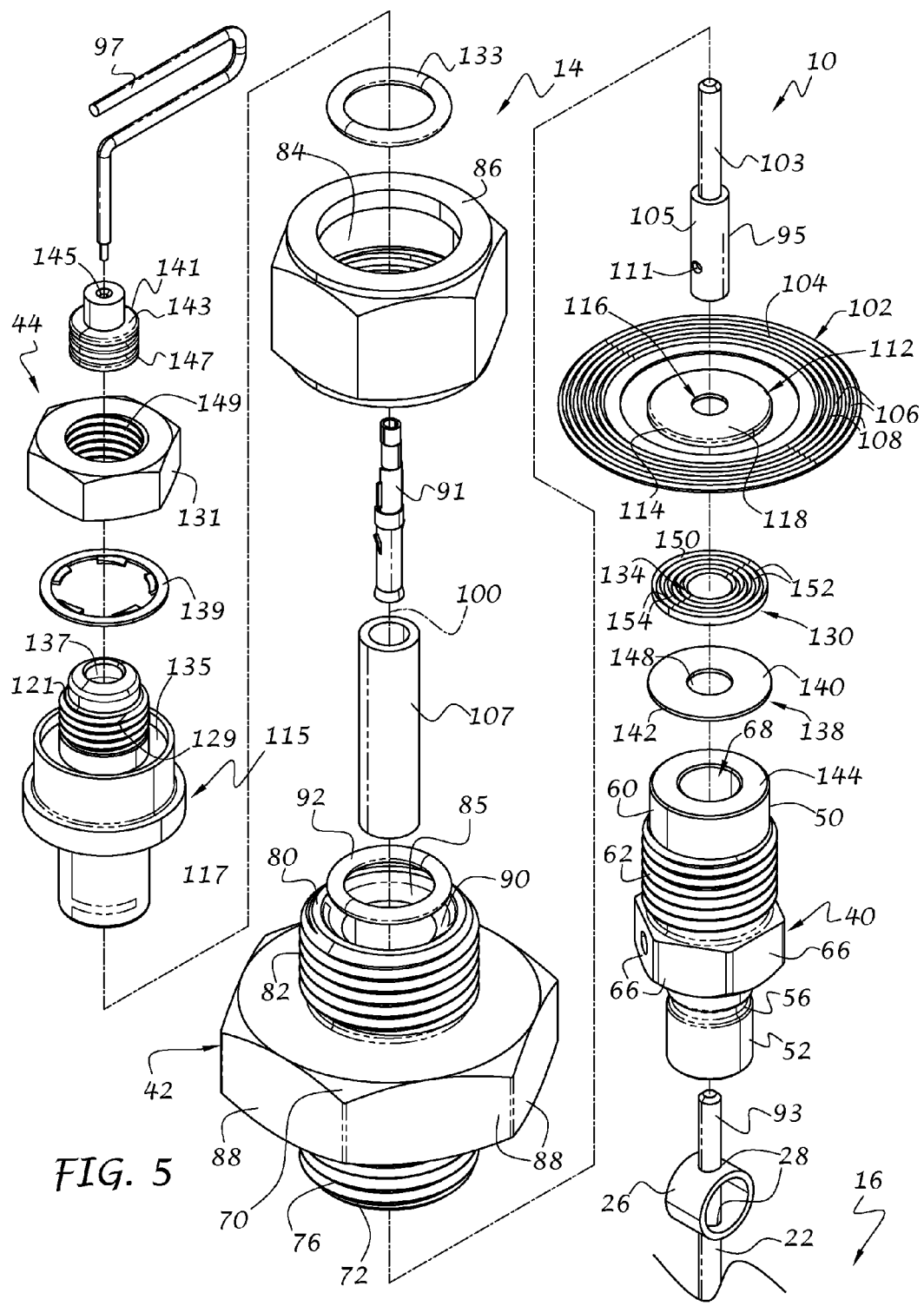
FIG. 5 is an enlarged top isometric exploded view of a mounting head assembly that forms part of the liquid level transducer in accordance with the invention.
Figure 6:
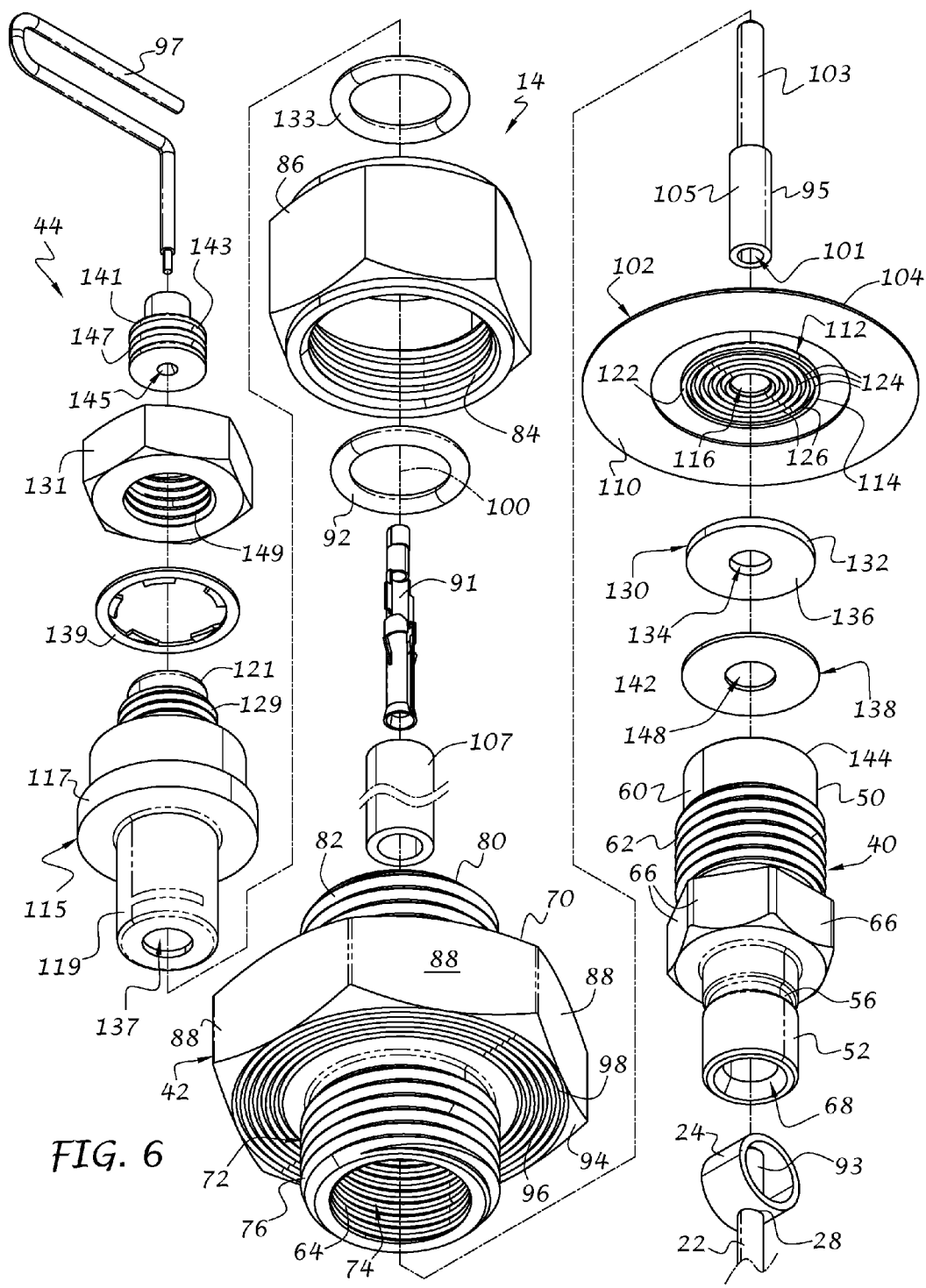
FIG. 6 is an enlarged bottom isometric exploded view of the mounting head assembly of the FIG. 5 embodiment.

As best shown in FIGS. 5 and 6, flat tool engaging surfaces 88 are formed on the body 70 of the intermediate mounting member 42, between the first and second connecting portions 72 and 80, respectively, so that a tool, such as a wrench or the like, can be used for securing the intermediate mounting member 42 to both the lower mounting member 40 and the upper mounting assembly 44. An upper step or seat 90 is formed in the body 70 coincident with the second connecting portion 80 for receiving and O-ring 92 or the like. When the coupling 86 and the intermediate mounting member 42 are secured together, the O-ring is sandwiched between both members to seal the internal components of the mounting head assembly 14 against leakage.

A lower surface 94 (see also FIG. 5B) of the tank mounting member 42 is formed with a corrugated or wavy surface feature comprising alternating ridges 96 and grooves 98 that are circular in shape and coaxial about a central axis 100 of the mounting head assembly 14 to thereby form a first corrugated sealing surface. An outer annular disk-shaped seal 102 has a top surface 104 with a corrugated or wavy surface feature comprising alternating grooves 106 and ridges 108 (FIG. 5) that complement the ridges 96 and grooves 98, respectively, to thereby form a second corrugated sealing surface that engages the first corrugated sealing surface. The provision of the corrugated sealing surfaces, such as the grooves and ridges, greatly increases the surface area over which the materials will mate, and at the same time form an interlocking labyrinth-type seal that defines a tortuous surface structure, thereby making it difficult for fluid to escape from the tank 12, even under high tank pressures and extreme temperature conditions within the tank. The seal 102 is preferably formed of a high performance PTFE material, such as Gylon®, provided by Garlock Sealing Technologies. It will be understood that other materials can be used for the seal 102 without departing from the spirit and scope of the invention. Moreover, it will be understood that the particular number, size and shape of the grooves and ridges can greater vary and is therefore not to be limited by the exemplary embodiment as illustrated. A lower surface 110 (FIG. 6) of the seal 102 is preferably flat in shape to accommodate the flat shape of the wall 15 of the tank 12. However, it will be understood that the lower surface 110 and/or wall 15 can have a similar corrugated construction as previously described.

Referring now to FIGS. 7-9, a first inner annular sealing disk 112 includes a body 114 with a central bore 116 extending therethrough to allow passage of the connecting pin 103 of the electrical extension 95. The first inner sealing disk 112 has an upper flat surface 118 (FIG. 5) that seats against a lower surface 120 of the intermediate wall section 87 within the lower bore 74 of the tank mounting member 42. The first inner sealing disk 112 also has a lower surface 122 with alternating ridges 124 and grooves 126 that are circular in shape and coaxial about the central axis 100 of the mounting head assembly 14 to thereby form a first inner corrugated sealing surface.

A second inner annular sealing disk or washer 130 includes a body 132 (FIGS. 6 and 9) with a central bore 134 extending therethrough to allow passage of the connecting pin 103. The second inner sealing disk 130 has a lower flat surface 136 (FIG. 6) that seats against an upper flat surface 140 of a third inner annular sealing disk 138. The third inner sealing disk 138 has a lower surface 142 that seats against the upper surface 144 of the lower mounting member 40, and a central bore 148 extending therethrough to allow passage of the connecting pin 103. The second inner sealing disk 130 also has an upper surface 150 (FIG. 5) with alternating grooves 154 and ridges 152 that are circular in shape and coaxial about the central axis 100 of the mounting head assembly 14 complement the ridges 124 and grooves 126, respectively, of the first inner sealing disk 112, to thereby form a second inner corrugated sealing surface that engages the first inner corrugated sealing surface. The provision of the complementary inner grooves and ridges in this manner greatly increases the surface area over which the materials will mate, and at the same time form an interlocking labyrinth-type seal that makes it difficult for fluid to escape from the tank 12 through the bores of the mounting head assembly 14, even under high tank pressures and extreme temperature conditions within the tank. One or both inner seals 112, 138 are preferably formed of a high performance PTFE material, such as Gylon®, provided by Garlock Sealing Technologies. The second inner sealing disk or washer 130 is preferably constructed of a conductive material, such as stainless steel, and attached to the cylindrical wall 104 of the electrical extension 95 to retain the inner electrode 22 in a vertical orientation when assembled. The second inner sealing disk 130 can be retained by soldering, crimping, resistance welding, or by any other suitable connecting means. It will be understood that other materials can be used for the inner seals and/or washer without departing from the spirit and scope of the invention. Moreover, it will be understood that the particular number, size, and shape of the grooves and ridges can greater vary and are therefore not to be limited by the exemplary embodiment as illustrated.

Although only one surface of each inner seal is shown with a corrugated surface, it will be understood that opposing surfaces of the inner disk seals can have corrugated surfaces with complementary corrugated shapes being formed in the intermediate wall, the third seal or washer, and/or the upper surface of the lower mounting member 40.

Figure 5A:
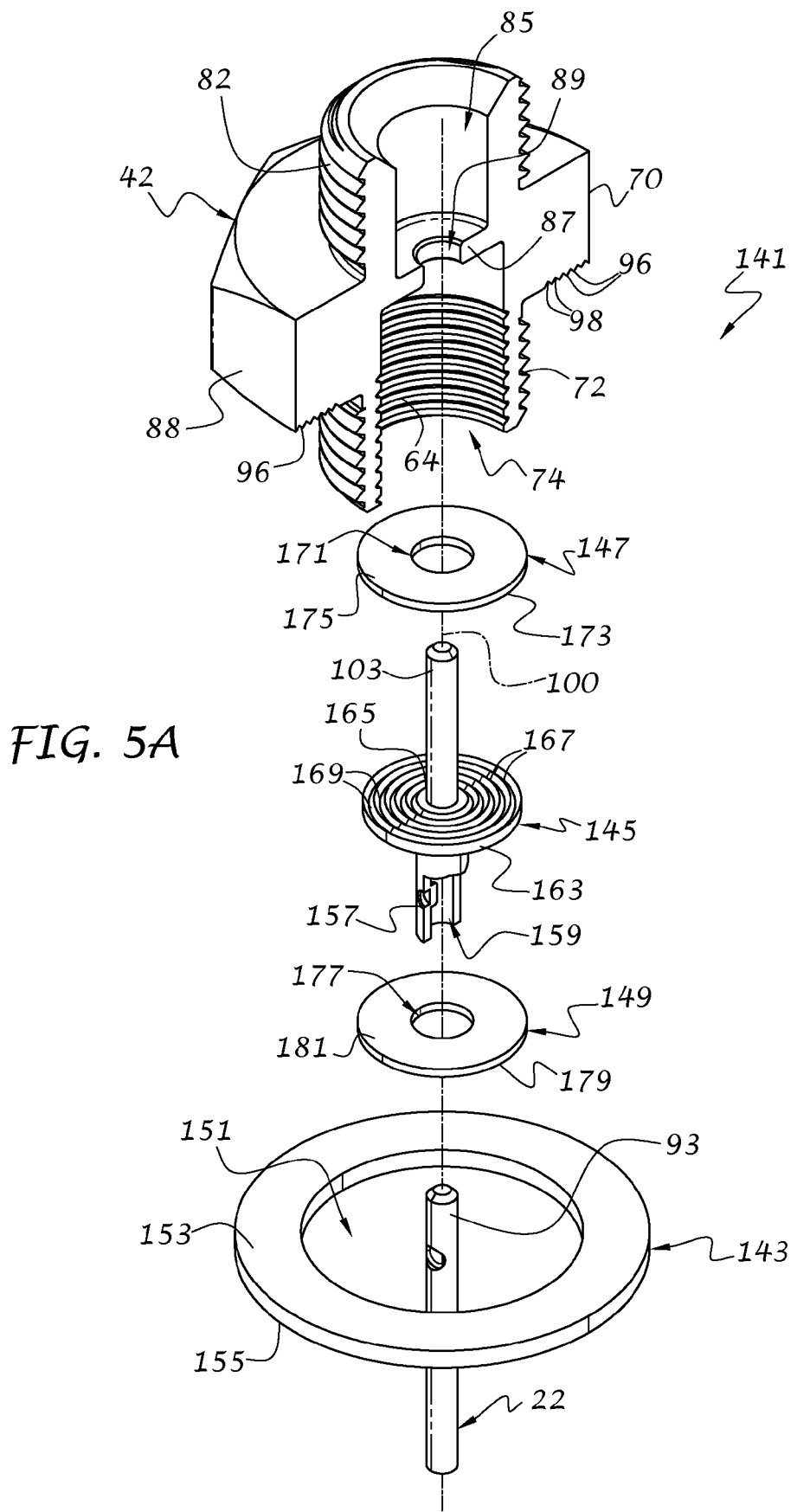
FIG. 5A is an enlarged top isometric exploded view of a portion of a mounting head assembly in accordance with a further preferred embodiment of the invention, with the tank mounting member shown in cross-section for clarity.
Figure 5B:
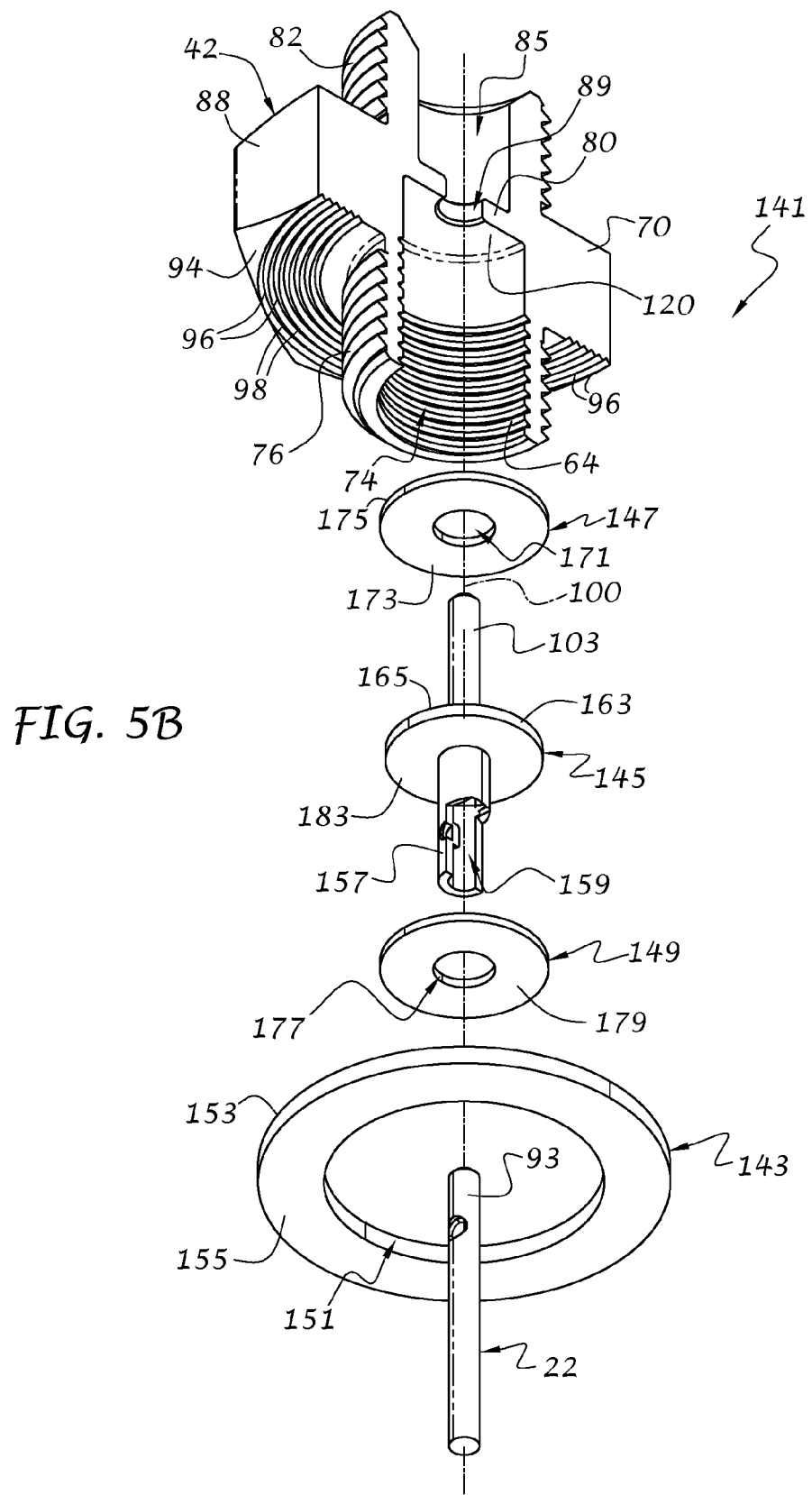
FIG. 5B is an enlarged bottom isometric exploded view thereof.

Referring now to FIGS. 5A and 5B, an isometric exploded view of a portion of a mounting head assembly 141 in accordance with a further preferred embodiment of the invention is illustrated. The mounting head assembly 141 preferably includes the tank mounting member 42 (shown in isometric cross-section for clarity), an outer seal 143 sandwiched between the lower surface 94 of the tank mounting member 42 and the wall 15 (FIGS. 1 and 9) of the tank 12, an electrically conductive inner electrode extension member 145 extending into the lower bore 74, a first inner seal 147 in sealing contact with the inner electrode extension 145, and a second inner seal 149 that is sandwiched between the first inner seal 147 and the lower surface 120 of the central wall 87 of the tank mounting member 42.

The outer seal 143 is preferably formed as an annular disk-shaped seal with a central opening 151 for receiving the first connecting portion 72 of the tank mounting member 42, a flat top surface 153 (FIG. 5A) that seats against the lower surface 94 of the tank mounting member, and a flat bottom surface 155 (FIG. 5B) that seats against the wall 15 (FIGS. 1 and 9) of the tank 12. As in the previous embodiment, the lower surface 94 (FIG. 5B) of the tank mounting member 42 is formed with alternating ridges 96 and grooves 98 that are circular in shape and coaxial about a central axis 100 of the mounting head assembly 14 to thereby form a first or outer corrugated sealing surface.

The outer seal 143 is constructed of a material that is sufficiently resilient and compressible so that the flat top surface 153 of the outer seal 143 is pressed into the first corrugated sealing surface of the tank mounting member 42 when the mounting head assembly 141 is tightened against the wall 15 of the tank 12. The outer seal 143 is preferably formed of a high performance PTFE material, such as Gylon®, provided by Garlock Sealing Technologies. It will be understood that other materials can be used for the seal 143 without departing from the spirit and scope of the invention. Moreover, it will be understood that the particular number, size and shape of the grooves and ridges can greatly vary and is therefore not to be limited by the exemplary embodiment as illustrated.

The inner electrode extension 145 is preferably constructed of electrically conductive material and includes a connector 157 having a generally cylindrical side wall and a central bore 159 extending therethrough for receiving the upper end 93 of the inner electrode 22. As shown, the cylindrical side wall 157 is a partial cut-away view to show the central bore 159 with greater clarity. During assembly, the side wall 157 can be crimped, pinched, or otherwise formed around the electrode 22 to thereby mechanically and electrically connect the inner electrode extension 145 with the inner electrode 22. It will be understood that other well-known means of electrically and mechanically connecting the extension 145 with the electrode 22 can be used without departing from the spirit and scope of the invention, such as press-fitting, soldering, and so on.

A sealing flange 163 is integrally formed with the inner electrode extension 145 between the side wall 157 and the connecting pin 103. The sealing flange 163 is preferably circular in shape and of a diameter to closely match the inner diameter of the lower bore 74 of the tank mounting member 42. The sealing flange 163 includes an upper surface 165 with alternating ridges 167 and grooves 169 that are circular in shape and coaxial about a central axis 100 of the mounting head assembly 14 to thereby form a second or inner corrugated sealing surface for receiving the first inner seal 147. The connecting pin 103 extends upwardly from the sealing flange 163 and, as in the previous embodiment, is in turn mechanically and electrically connected to the electrical terminal 91 (FIG. 6) through crimping, press-fitting, soldering, and/or other well-known connection means. It will be understood that the sealing flange 163 can be formed integrally with the inner electrode extension 145 or can be formed separately and connected thereto through welding, soldering, press-fitting, or other well-known connection means.

The first inner seal 147 is preferably formed as an annular disk-shaped seal with a central opening 171 for receiving the connecting pin 103 of the inner electrode extension 145 (FIG. 5A), with a flat bottom surface 173 (FIG. 5B) that seats against the upper or second corrugated sealing surface 165 (FIG. 5A), and a flat top surface 175 (FIG. 5A) that seats against the lower surface 120 of the intermediate wall section 87 within the lower bore 74 of the tank mounting member 42. The first inner seal 147 is constructed of a material that is sufficiently resilient and compressible so that the flat bottom surface 173 of the first inner seal 147 is pressed into the second corrugated sealing surface 165 of the inner electrode extension 145 when the first mounting member 40 (FIG. 9) is connected to the tank mounting member 42, as previously described. The first inner seal 147 is preferably formed of a high performance PTFE material, such as Gylon®, provided by Garlock Sealing Technologies. It will be understood that other materials can be used for the seal 147 without departing from the spirit and scope of the invention. Moreover, it will be understood that the particular number, size and shape of the grooves and ridges in the corrugated surface 165 can greatly vary and is therefore not to be limited by the exemplary embodiment as illustrated.

The second inner seal 149 is preferably formed as an annular disk-shaped seal with a central opening 177 for receiving the cylindrical side wall 157 of the inner electrode extension 145 (FIG. 5A), with a flat bottom surface 179 (FIG. 5B) that seats against the upper surface 144 of the lower tank mounting member 40 (FIG. 5) when assembled, and a flat top surface 181 (FIG. 5A) that seats against the lower surface 183 of the sealing flange 163 associated with the inner electrode extension 145. within the lower bore 74 of the tank mounting member 42, and insulates the inner electrode 22 from the lower mounting member 40 (FIG. 7). The second inner seal 149 is constructed of a material similar to the material for the first inner seal. Although the lower surface 120 of the intermediate wall section 87 and upper surface 144 of the lower mounting member 40 is shown as flat, it will be understood that one or both surfaces can be formed with alternating ridges and grooves to a form corrugated surface against which the flat top surface 175 of the first inner seal 147 and the flat bottom surface 179 of the second inner seal 149 can be seated and assume the shape thereof, respectively.

With the above-described sealing construction, the provision of grooves and ridges in this manner greatly increases the surface area over which the materials will mate, and at the same time form an interlocking labyrinth-type seal that makes it difficult for fluid to escape from the tank 12, even under high tank pressures and extreme temperature conditions within the tank, while at the same time electrically isolating the tank mounting member 42 from the inner electrode 22.

Figure 4:
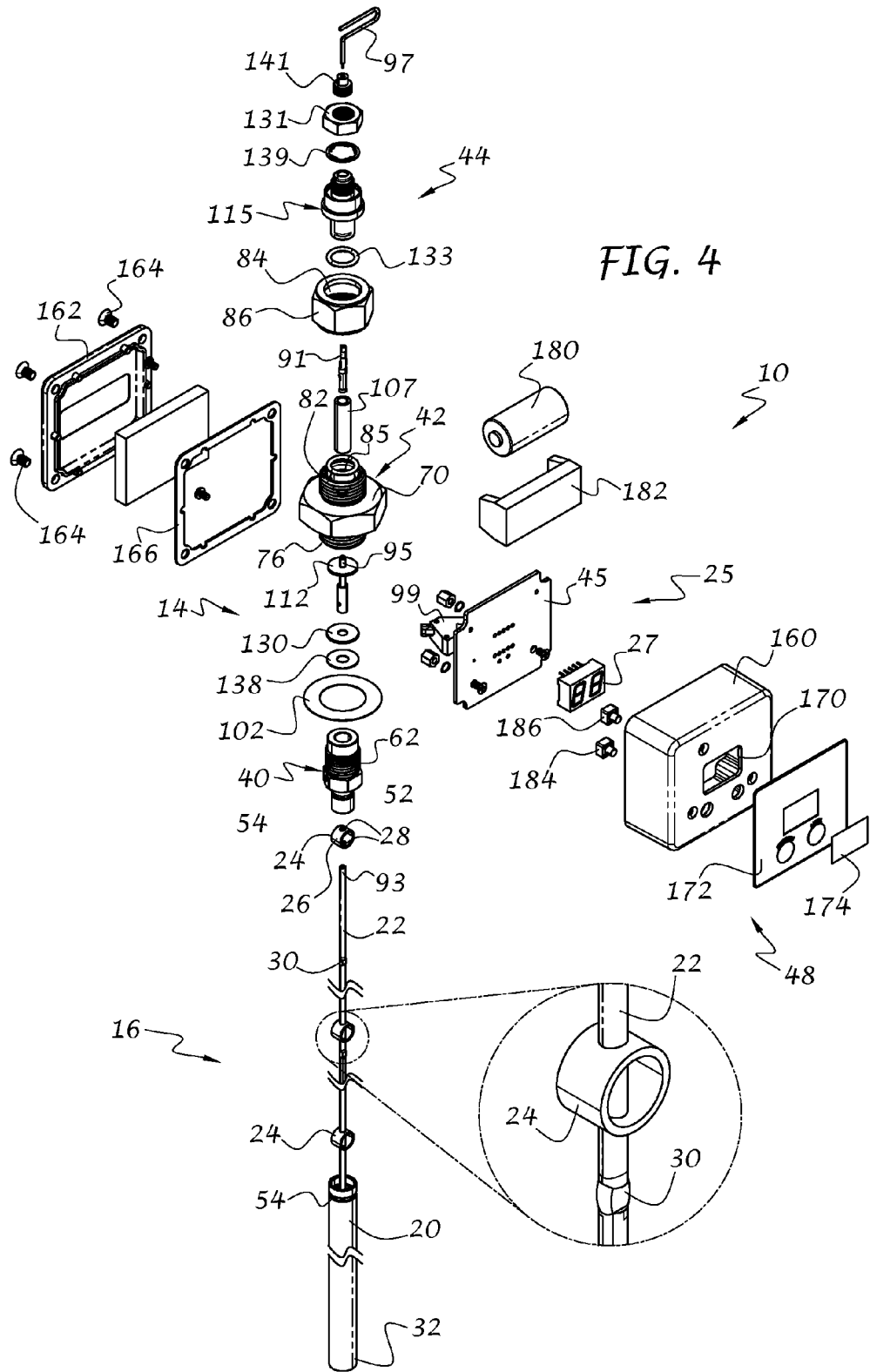
FIG. 4 is a top right isometric exploded view of the liquid level transducer.

As best shown in FIG. 4, the housing assembly 48 is independent of the sealing arrangement, and therefore can be used with either sealing embodiment. The housing assembly 48 can have a first housing section 160 connected to a second housing section 162 via fasteners 164. A gasket 166 is sandwiched between the housing sections for sealing the interior volume and protecting the electronic assembly 25 from atmospheric conditions. A window 170 is formed in the housing section 160 and a cover plate 172 is mounted on the outside of the housing section 162 in a known manner with a transparent window cover 174 in alignment with the display 27 so that the liquid level can be viewed through the housing. It will be understood that the housing can be eliminated, as shown in FIG. 3 for example, and the electronic assembly can be connected and arranged for wirelessly transmitting liquid level signals to a remote location via a transmitter or transceiver for example.

The electronic assembly 25 preferably includes the PCB 45 with a processor and other electronics (not shown) connected to a power source 180, such as one or more batteries as shown positioned in a battery holder 182 that is in turn mounted within the housing assembly 48. A user interface, such as momentary push-button switches 184 and 186 can be used, in conjunction with the microprocessor and related programming, to calibrate the liquid level transducer, display liquid level readings in different units, set time, date and alarm data, and so on. It will be understood that the invention is not limited to the electronics assembly as shown, as the electronic circuitry, display, liquid level, temperature, pressure, and other data, and so on, can be measured or determined using a wide variety of circuitry, components, and programs, as is well known in the art. Moreover, the power source 180 need not be in the form of a battery, but can be any suitable power source, either portable or permanently located, without departing from the spirit and scope of the invention.

It will be understood that the term "cylindrical" as well as its derivatives as may be used throughout the specification are given by way example only since the cylindrically-shaped components as shown throughout the drawing figures can be configured with other shapes such as square, triangular, and so on. Thus, the invention is not limited to components that are circular in cross section, but can encompass any suitable cross sectional shape.

It will be understood that the mounting head assembly 14 is not limited to a threaded mounting arrangement, such as the straight threads shown, but can alternatively utilize NPT threads, a flange mounting arrangement (not shown), as well as other means for mounting the liquid level transducer 10 to a tank or other container including, but not limited to, welding, adhesive bonding and so on, without departing from the spirit and scope of the invention.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification, such as "lower" and "upper", denote relative, rather than absolute orientations and/or positions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A transducer (10) for determining the level of liquid within a pressurized tank (12), the tank having a tank wall (15) and an opening (17) formed therein, the transducer comprising:

an elongate sensing probe (16) adapted to extend into the tank for determining liquid level within the tank, the elongate sensing probe having a first elongate electrode (22) for performing at least one of generating, modifying, and relaying an electrical signal indicative of the liquid level;

a mounting head assembly (14) connected to the elongate sensing probe (16), the mounting head assembly being adapted for connection to the tank for sealing the tank opening (17) to thereby maintain pressure within the tank (12), the mounting head assembly comprising:

a lower mounting member (40) having a first body (50) formed of electrically conductive material for electrical connection to the first elongate electrode (22), the first body including a first lower connecting portion (52) mechanically connectable to the elongate sensing probe (16), a first upper connecting portion (60), and a first central bore (68) extending through the first lower and upper connecting portions and defining a first central axis; the first elongate electrode extending through the first central bore; and a tank mounting member (42) having;

a second body (70) including a second lower connecting portion (72) with a second central bore (74) formed in a lower end thereof and a third central bore (85) formed in an upper end thereof; and a fixed intermediate wall section (87) formed integrally with the second body (70), the fixed intermediate wall section (87) being located between and extending transverse to the second central bore and the third central bore;

the second central bore being sized to receive the first elongate electrode;

the first upper connecting portion (60) being received and retained within the second central bore (74) with an upper end of the first upper connecting portion (60) being located adjacent to the fixed intermediate wall section (87);

a corrugated feature (152, 154, 167, 169) associated with at least one of the fixed intermediate wall section (87) and the upper end of the first upper connecting portion (60); and a first inner seal (112, 147) configured as an annular disk and constructed of resilient material; the first inner seal being located in the second central bore (74) between the fixed intermediate wall section (87) and the upper end of the first upper connecting portion (60), the first inner seal being pressed into the corrugated feature between the fixed intermediate wall section (87) and the upper end of the first upper connecting portion (60) by moving the first upper connecting portion (60) toward the fixed intermediate wall section (87) to thereby interlock the first inner seal and the corrugated feature while increasing a surface area therebetween and seal the mounting head assembly against leakage.

2. A transducer (10) according to claim 1, wherein the corrugated feature comprises alternating ridges and grooves.

3. A transducer (10) according to claim 2, wherein the alternating ridges and grooves are circular in shape and coaxial.

4. A transducer (10) according to claim 1, and further comprising an extension member (145) having a connector (157) electrically connected to an upper end of the first elongate electrode (22, 20) and a sealing flange (163) encircling the connector, the sealing flange being configured to fit within the second central bore (74) and including an upper surface with the corrugated feature, so that the first seal is sandwiched between the sealing flange and the fixed intermediate wall section (87).

5. A transducer (10) according to claim 4, wherein the extension member further comprises a connecting pin (103) for connection to electrical circuitry (25) to thereby process liquid level signals from at least the first elongate electrode, the connecting pin extending through a central opening (171) in the first inner seal (147) and a central opening (89) in the fixed intermediate wall section (87), the central opening (89) being smaller in diameter than the second and third central bores, but sufficiently large so that the connecting pin is electrically isolated from the fixed intermediate wall section (87).

6. A transducer (10) according to claim 5, wherein the elongate sensing probe (16) further comprises a second elongate electrode (20) connected to the lower mounting member (40) and electrically isolated from the first elongate electrode (22), the first and second electrodes together performing at least one of generating, modifying, and relaying an electrical signal indicative of the liquid level.

7. A transducer (10) according to claim 6, wherein the first and second elongate electrodes are circular in cross-section and coaxial.

8. A transducer (10) according to claim 7, and further comprising:

an electronic section (25) electrically connected to the first and second electrodes for processing electrical signals therefrom; and a housing enclosing the electronic section; and a second upper connecting portion (80) extending upwardly from the second body (70) of the tank mounting member (42), the housing being connected to the second upper connecting portion (80).

9. A transducer (10) according to claim 8, wherein the first elongate electrode (22) extends through the second upper connecting portion (80) and is electrically isolated therefrom.

10. A transducer (10) according to claim 9, wherein the second lower connecting portion (72) of the tank mounting member (42) comprises a lower surface (94) with a second corrugated feature (96, 98); and further comprising an outer seal (102) constructed of resilient material and configured for location between the lower surface (94) of the second lower connecting portion (72) and the tank wall, the outer seal being pressed into the second corrugated feature (96, 98) by moving the tank mounting member (42) toward the tank wall (15) to thereby interlock the outer seal and the second corrugated feature while increasing a surface area therebetween and seal the mounting head assembly against leakage with respect to the tank wall.

11. A transducer (10) according to claim 1, wherein the second lower connecting portion (72) of the tank mounting member (42) comprises a lower surface (94) with a second corrugated feature (96, 98); and further comprising an outer seal (102) constructed of resilient material and configured for location between the lower surface (94) of the second lower connecting portion (72) and the tank wall, the outer seal being pressed into the second corrugated feature (96, 98) by moving the tank mounting member (42) toward the tank wall (15) to thereby interlock the outer seal and the second corrugated feature while increasing a surface area therebetween and seal the mounting head assembly against leakage with respect to the tank wall.

12. A transducer (10) according to claim 1, wherein the second central bore (74) is formed with inner threads (64) and the first upper connecting portion (60) is formed with outer threads (62) for engagement with the inner threads (64) to thereby connect the tank mounting member (42) and the lower mounting member together and cause the first upper connecting portion (60) to move toward the fixed intermediate wall section (87) and press the first inner seal into the corrugated feature as the first upper connecting portion (60) is threaded into the second central bore (74).

13. A mounting head assembly (14) for connection to a cryogenic tank (12) having a tank wall (15) and an opening (17) formed therein, and being adapted for sealing the tank opening (17) to thereby maintain pressure within the tank (12), the mounting head assembly comprising:

a lower mounting member (40) having a first body (50) with a first upper connecting portion (60) and a first central bore (68) extending therethrough, the lower mounting member being adapted for connection to a sensor probe (16);

a tank mounting member (42) having a second body (70) with a lower connecting portion (72), a second central bore (74) and a third central bore (85) formed therein and a fixed intermediate wall section (87) formed in the second body and located between the second and third central bores; the fixed intermediate wall section (87) being integral with the second body (70) and extending transverse to a central axis of the second and third central bores;

the first upper connecting portion (60) being received and retained within the second central bore (74) and being operably associated with an upper surface (144 or 150) located adjacent to the fixed intermediate wall section (87);

a corrugated feature (152, 154, 167, 169) associated with at least one of the fixed intermediate wall section (87) and the upper surface (144 or 150); and an inner seal (112, 147) constructed of resilient material and configured for location in the second central bore (74) between the fixed intermediate wall section (87) and the upper surface (144 or 150), the inner seal being pressed into the corrugated feature by moving the first upper connecting portion (60) toward the fixed intermediate wall section (87) to thereby interlock the inner seal and the corrugated feature while increasing a surface area therebetween and seal the mounting head assembly against leakage.

14. The mounting head assembly (14) according to claim 13, and further comprising:

the lower connecting portion (72) of the tank mounting member (42) having a lower surface (94) extending parallel with, but offset from, the fixed intermediate wall section (87), the lower surface (94) including a second corrugated feature (96, 98); and an outer seal (102) constructed of resilient material and configured for location between the lower surface (94) of the lower connecting portion (72) and the tank wall, the outer seal being pressed into the second corrugated feature (96, 98) to thereby interlock the outer seal and the second corrugated feature while increasing a surface area therebetween to seal the mounting head assembly against leakage with respect to the wall of the tank.

15. The mounting head assembly (14) according to claim 13, wherein the second central bore (74) is formed with inner threads (64) and the first upper connecting portion (60) is formed with outer threads (62) for engagement with the inner threads (64) to thereby connect the tank mounting member (42) and the lower mounting member (40) together and cause the first upper connecting portion (60) to move toward the fixed intermediate wall section (87) and press the first inner seal into the corrugated feature as the first upper connecting portion (60) is threaded into the second central bore (74).

16. A transducer (10) for determining the level of liquid within a pressurized tank (12), the transducer comprising:

a mounting head assembly (14) adapted for connection to the tank (12); and an elongate sensing probe assembly (16) adapted to extend into the tank from the mounting head assembly (14);

the mounting head assembly comprising a lower mounting member (40) with a first central bore (68) for receiving at least a portion of the sensing probe assembly (16), and a tank mounting member (42) with a lower connection portion (72) comprising a second central bore (74), a third central bore (85) coaxial with the second central bore and separated therefrom by a fixed transverse wall (87) located between the second central bore and the third central bore; the second central bore being sized to receive at least a portion of the sensing probe assembly;

the lower mounting member (40) having an upper connecting section (60) located within the second central bore (74) with an upper end of the upper connecting section being operably associated with an upper surface (144 or 150) located adjacent to the fixed transverse wall; and an inner seal (147) positioned between the fixed transverse wall (87) and the upper surface (144 or 150) operably associated with the upper connecting section (60), at least one of the transverse wall and the upper surface (144 or 150) having a first corrugated shape that receives the inner seal to thereby form a labyrinth-type seal for sealing the mounting head assembly against leakage between the mounting head and the lower mounting member.

17. A transducer (10) according to claim 16, and further comprising:

the lower connecting portion (72) of the tank mounting member (42) having a lower surface (94) extending parallel with, but offset from, the fixed transverse wall (87), the lower surface (94) including a second corrugated shape (96, 98); and an outer seal (102) constructed of resilient material and configured for location between the lower surface (94) of the lower connecting portion (72) and the tank wall, the outer seal being pressed into the second corrugated shape (96, 98) to thereby interlock the outer seal and the second corrugated shape while increasing a surface area therebetween to seal the mounting head assembly against leakage with respect to the wall of the tank.

18. A transducer (10) according to claim 17, wherein an outer diameter of the inner seal (147) is smaller than an inner diameter of the outer seal (102).

19. A transducer (10) according to claim 17, wherein the inner seal (147) and outer seal (102) comprise flat disk material with smooth upper and lower surfaces, wherein the inner and outer seals are sufficiently pressed into the respective first and second corrugated shapes to change the flat disk material into first and second corrugated seals.

20. A transducer (10) according to claim 16, wherein the elongate sensing probe includes an inner elongate electrode (20, 22) electrically isolated from the mounting head assembly, and further comprising:

an extension member (145) having a connector (157) electrically connected to an upper end of the inner elongate electrode (20, 22) and a sealing flange (163) encircling the connector, the sealing flange being configured to fit within the second central bore (74) and including an upper surface with the first corrugated shape, so that the inner seal is sandwiched between the sealing flange and the fixed transverse wall (87);

a connecting pin (103) operably associated with the extension member (145) for connection to electrical circuitry (25) to thereby process liquid level signals from at least the inner elongate electrode;

the connecting pin extending through a central opening (171) in the inner seal (147) and a central opening (89) in the fixed transverse wall (87);

wherein the connecting pin is electrically isolated from the fixed transverse wall section (87).

* * * * *